(No Model.)

H. E. LEA.
FILTER ATTACHMENT FOR COFFEE POTS.

No. 269,503. Patented Dec. 19, 1882.

Witnesses:

Inventor:
Henry E. Lea
By his Attys,

UNITED STATES PATENT OFFICE.

HENRY E. LEA, OF SAN FRANCISCO, CALIFORNIA.

FILTER ATTACHMENT FOR COFFEE-POTS.

SPECIFICATION forming part of Letters Patent No. 269,503, dated December 19, 1882.

Application filed May 25, 1881. (No model.)

*To all whom it may concern:*

Be it known that I, HENRY E. LEA, of the city and county of San Francisco, in the State of California, have made and invented a new and useful Improvement in Filter Attachments for Coffee-Pots; and I do hereby declare that the following is a full, clear, and exact description of the same, reference being had to the accompanying drawings.

The invention has reference to percolators used in coffee-pots for straining the coffee in which a cloth strainer is used, held in place by a tightening-flange, and will be understood as hereinafter set forth and claimed.

Figure 1:
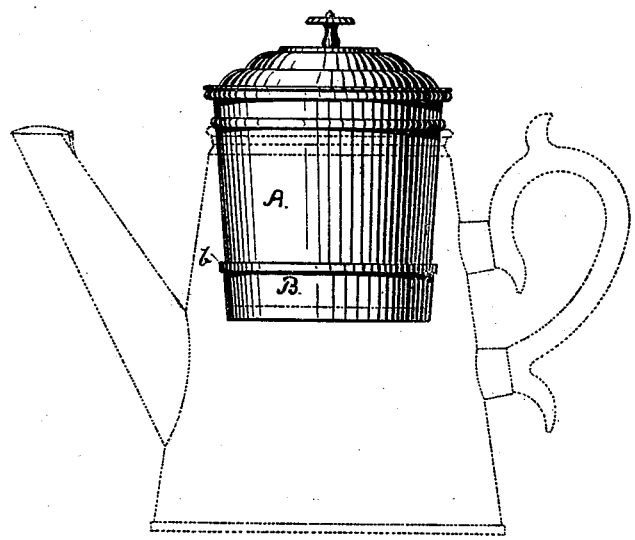
Figure 2:
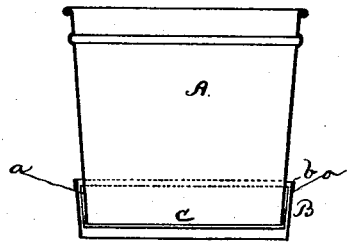
Figure 3:
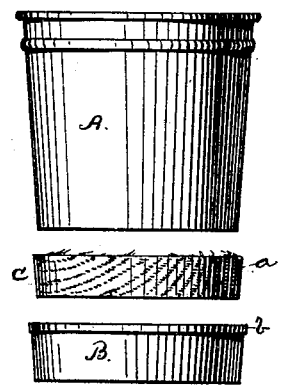

In the accompanying drawings, to which reference is made in the following description, Figure 1 shows the percolator in place in a coffee-pot. Fig. 2 is a vertical section through it, and Fig. 3 the parts separated and in detail.

A represents the body of the percolator or strainer attachment, which is cylindrical in cross-section, but tapering or of conical shape longitudinally, so that it is larger at the top than at the bottom. This conical shape is for the twofold purpose of causing the upper portion of the body A to fit tightly within the mouth of the coffee pot or vessel when inserted in it, and of making the lower end of the required shape to receive a tapering clamping-ring, B. This tapering ring B is made a little larger than the end of the body A, over which it is placed, in order that when the cup-shaped strainer is adjusted on the smaller end of the body A this ring will slip over the end of the body A thus covered by the material C, and the rim, flange, or margin thereof will be clamped between the ring and the body A, and by reason of the conical or tapering form of both these surfaces A B the material C will be drawn tightly and stretched and held over the bottom of the body as the ring B is crowded on over it. The ring B is made broad, so that when forced upon the bottom of the filter the lower edge of the ring cannot pass up above the bottom of the said filter. This arrangement makes it possible to force the ring in place with the utmost stress desired by simply setting it on some firm structure and forcing or pressing the filter in it, the bottom of the ring being free and performing no function; but this is not impaired as to usefulness by the slight battering which it may receive.

The strainer-surface C, I make of a piece of cotton cloth or other suitable fabric, cut to fit over the end of the body A, and leave a small margin all around to be clamped under the ring B, and forms the flange or rim $a$ of the strainer-cup, so that when the bottom of the percolator requires to be cleaned or renewed this surface can be readily taken off and replaced by the housekeeper at trifling cost and without loss of time. This cup-shaped strainer C, besides, affords interstices of such fineness that it is not readily choked and closed up, and will not permit any particles to escape with the water, and therefore gives a better filtering-surface.

The flange or rim $a$ of the cup-shaped strainer C serves as a packing between the tapered ring B and correspondingly-tapered body A, and when the said flange $a$ becomes wet it swells and is firmly held in place on the body A by said ring. The ring B is formed with a broadened top, $b$, which is put on in the shape of a flange, or by bending the top of the ring over upon itself. This broadened top gives strength and security to the ring when it is forced upon the base of the percolator, as it has to be very tightly, in order to sustain the strainer-cloth when the load of coffee is delivered in the percolator. When the device has been in use some time the steam, moisture, and particles which may come in contact with the parts thus united tend to swell the cloth and tighten the ring upon the percolator and make it hard to remove. The advantage of this broadened top is then to enable an easy removal of the ring by tapping it from above, and this may be done without any fear of bending or indenting the edge.

In applying this form of percolator to coffee-pots the top of the body A, which projects outside of the pot, should be made of the same diameter as the mouth of the pot itself, so that in practice the lid or cover of the pot or vessel can be used as a cover for the top of the percolator, the advantage of which will be obvious.

This device is particularly easy to take apart or put together, and the strainer C can be readily removed, washed, and replaced, or a new one substituted for it. When the parts are separated the strainer is placed over the bottom of the body, and, together with the body, is pressed into the ring, which, being broad enough to prevent its going up past the bottom edge of the body, allows any degree of tightness to be attained between it and the strainer and body by this simple forcing down of the body. Then when the strainer is to be removed the broadened top *b* enables it to be readily and easily done without danger of battering the sides of the percolator-body by the blows which would come so close if it were not for this broadened top.

Having thus fully described my improvement, what I claim, and desire to secure by Letters Patent, is—

The herein-described percolator for use in coffee and similar pots, consisting of the tapering body A, having the plane bottom, a strainer, C, of woven material, having a turned-up portion to fit around the base of the body, and a ring, B, provided with a broadened top, *b*, and constructed of considerable width and such diameter as to become tight over the body and strainer portion *a* before the bottom of the ring is up as far as the bottom of the body, substantially as shown and described, and for the purpose set forth.

HENRY E. LEA. [L. S.]

Witnesses:
 EDWARD OSBORN,
 CHAS. E. KELLY.